(12) United States Patent
Habu et al.

(10) Patent No.: US 10,150,475 B2
(45) Date of Patent: Dec. 11, 2018

(54) TRAVELING CONTROL APPARATUS FOR A VEHICLE

(71) Applicant: DENSO CORPORATION, Kariya, Aichi-pref. (JP)

(72) Inventors: Toshiya Habu, Kariya (JP); Takahisa Yokoyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 76 days.

(21) Appl. No.: 15/158,362

(22) Filed: May 18, 2016

(65) Prior Publication Data

US 2016/0339914 A1    Nov. 24, 2016

(30) Foreign Application Priority Data

May 19, 2015    (JP) .................................. 2015-101568

(51) Int. Cl.
*B60W 30/16* (2012.01)
*B60W 30/12* (2006.01)
*B60W 50/00* (2006.01)

(52) U.S. Cl.
CPC ............ *B60W 30/16* (2013.01); *B60W 30/12* (2013.01); *B60W 2050/0089* (2013.01);
(Continued)

(58) Field of Classification Search
CPC ........... B60W 10/06; B60W 2550/308; B60W 2550/402; B60W 2550/408;
(Continued)

(56) References Cited

U.S. PATENT DOCUMENTS 5,177,462 A    1/1993  Kajiwara
6,032,098 A *  2/2000  Takahashi ............... G01C 21/28
                                                    701/23
(Continued)

FOREIGN PATENT DOCUMENTS

JP          07230600 A  *  8/1995  ............... G08G 1/16
JP       H07-230600 A     8/1995
(Continued)

*Primary Examiner* — Anne M Antonucci
*Assistant Examiner* — Sanjeev Malhotra
(74) *Attorney, Agent, or Firm* — Knobbe, Martens, Olson & Bear, LLP (57) ABSTRACT

A traveling control apparatus includes a generation section generating traveling paths from a history of positions of vehicles present ahead of an own vehicle, a first control section defining one vehicle, which runs in a driving lane of the own vehicle, as a target, and making a lateral position of the own vehicle follow a lateral position which is a position of the target in a width direction of the own vehicle, a determination section determining, when follow-up control is performed, whether or not, in the driving lane, one of the vehicles cuts in a space between the own vehicle and the target, and a first selection section selecting, when cutting in is determined to occur, the current target or the cut-in vehicle as the target, based on a result of comparison between the lateral positions on the traveling paths respectively generated for the current target and the cut-in vehicle.

12 Claims, 6 Drawing Sheets

(52) U.S. Cl.
CPC . *B60W 2550/304* (2013.01); *B60W 2550/306* (2013.01); *B60W 2550/308* (2013.01)

(58) Field of Classification Search
CPC ..... B60W 2750/306; B60W 2750/308; B60W 30/16; G08G 1/167
USPC ...... 701/23, 48, 93, 301, 519; 340/435, 903; 342/28
See application file for complete search history.

(56) References Cited

U.S. PATENT DOCUMENTS

| | | | | |
|---|---|---|---|---|
| 8,781,707 | B2* | 7/2014 | Kagawa | B60W 30/16 340/903 |
| 8,855,860 | B2* | 10/2014 | Isaji | B62D 6/00 340/435 |
| 2005/0004759 | A1* | 1/2005 | Siegel | G01S 13/66 701/519 |
| 2012/0078500 | A1* | 3/2012 | Yamada | B60W 50/14 701/301 |
| 2012/0197497 | A1* | 8/2012 | Kato | B60W 30/18 701/48 |
| 2015/0088382 | A1 | 3/2015 | Obuchi | |
| 2015/0360688 | A1* | 12/2015 | Tanaka | B60W 10/06 701/93 |
| 2016/0103212 | A1* | 4/2016 | Nath | G01S 13/931 342/28 |

FOREIGN PATENT DOCUMENTS

| | | | | |
|---|---|---|---|---|
| JP | 2000-057500 | | 2/2000 | |
| JP | 2004-237885 | | 8/2004 | |
| JP | 2016112911 A | * | 6/2016 | ............ B60K 31/00 |
| JP | 2017087899 A | * | 5/2017 | .......... B60W 40/109 |

* cited by examiner

TRAVELING CONTROL APPARATUS FOR A VEHICLE

CROSS-REFERENCE TO RELATED APPLICATION

This application is based on and claims the benefit of priority from earlier Japanese Patent Application No. 2015-101568 filed May 19, 2015, the description of which is incorporated herein by reference.

BACKGROUND

Technical Field

The present invention relates to a traveling control apparatus for a vehicle. The traveling control apparatus makes an own vehicle follow another vehicle that is a target to be followed.

Related Art

Techniques are proposed which are for controlling the travel of an own vehicle so as to keep a predetermined distance between the own vehicle and a preceding vehicle. For example, the preceding vehicle detection apparatus disclosed in JP-A-7-230600 recognizes a proceeding vehicle and a white line marking off a lane in which the own vehicle runs to calculate the degree of cutting in the driving lane of the own vehicle by a different vehicle (another vehicle). When the degree of cutting in is relatively large, the preceding vehicle detection apparatus selects the different vehicle as a target subject to traveling control of the own vehicle to control a distance between the different vehicle and the own vehicle. When the degree of cutting in is not so large, the preceding vehicle detection apparatus does not select the different vehicle as a target subject to traveling control. Hence, unnecessary control is not performed.

Traveling control of making an own vehicle follow a preceding vehicle includes traveling control in the traveling direction for keeping a distance between the own vehicle and the preceding vehicle and traveling control in the lateral direction for making the lateral position of the own vehicle follow the lateral position of the preceding vehicle.

In a case where the lateral position of the own vehicle is made to follow the lateral position of the preceding vehicle, when another vehicle cuts in (enters) a space between the own vehicle and the preceding vehicle, the traveling control apparatus selects the vehicle that has cut in the space (hereinafter, referred to as "cut-in vehicle (cutting-in vehicle)") as a target to be controlled, to perform follow-up control (following control) of the lateral position for the cut-in vehicle. However, when a cut-in vehicle cuts in the space, if the cut-in vehicle is selected as a target to be followed in the lateral direction of the own vehicle too early during the cutting in, the own vehicle is likely to wobble in the lateral direction because the own vehicle follows the cut-in vehicle.

SUMMARY

An embodiment provides a traveling control apparatus for a vehicle which can prevent an inappropriate vehicle from being selected as a target to be followed in the lateral direction of an own vehicle.

As an aspect of the embodiment, a traveling control apparatus for a vehicle is provided. The apparatus includes: a generation section that generates traveling paths of vehicles from a history of positions of the vehicles present ahead of an own vehicle; a first control section that defines one vehicle, which is included in the vehicles and runs in a driving lane of the own vehicle, as a target to be followed, and that makes a lateral position of the own vehicle follow a lateral position which is a position of the target to be followed in a width direction of the own vehicle; a determination section that determines, when the first control section is performing follow-up control for the target to be followed, whether or not, in the driving lane of the own vehicle, one of the vehicles, which is different from the target to be followed, cuts in a space between the own vehicle and the target to be followed; and a first selection section that selects, when the determination section determines that cutting in occurs, the current target to be followed or the cut-in vehicle as the target to be followed, based on a result of comparison between the lateral positions on the traveling paths respectively generated for the current target to be followed and the cut-in vehicle.

DETAILED DESCRIPTION OF THE PREFERRED EMBODIMENTS

With reference to the accompanying drawings, hereinafter are described embodiments of a traveling control apparatus for a vehicle. The traveling control apparatus for a vehicle according to each of the embodiments is an in-vehicle apparatus mounted in the vehicle, and performs traveling control under which an own vehicle runs so as to follow another vehicle that runs ahead of the own vehicle and in the lane in which the own vehicle runs. Throughout the drawings, components identical with or similar to each other are given the same reference numerals for the sake of omitting unnecessary explanation.

First Embodiment

Figure 1:
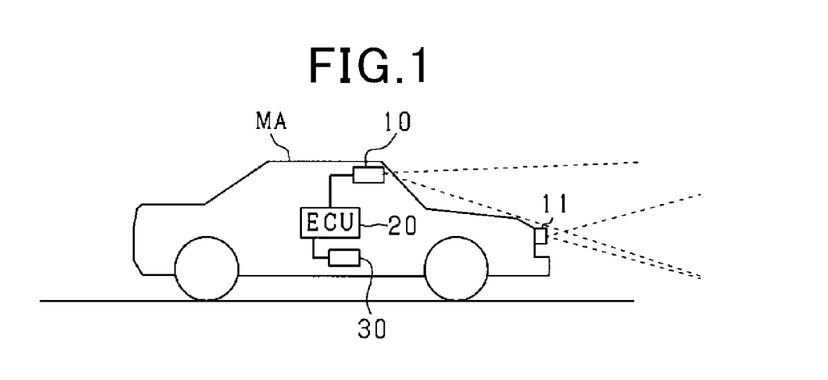
FIG. 1 is a drawing showing locations where an in-vehicle camera and a millimeter-wave radar are mounted in a vehicle.
Figure 2:
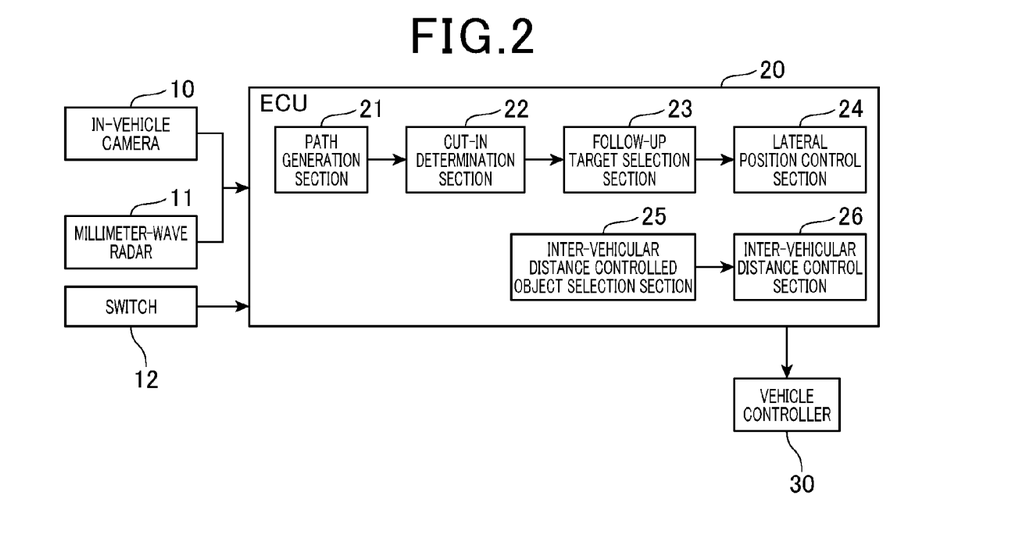
FIG. 2 is a block diagram showing a schematic configuration of a traveling control apparatus for a vehicle according to a first embodiment.

The schematic configuration of the traveling control apparatus for a vehicle according to the first embodiment is described with reference to FIG. 1 and FIG. 2. The traveling control apparatus is configured by an ECU (electronic control unit) 20. The ECU 20 is a computer including a CPU, a ROM, a RAM, and an I/O. The CPU executes a program stored in the ROM to realize functions described later. The ECU 20 calculates a controlled variable for traveling control of an own vehicle MA based on information received from an in-vehicle camera 10 and a millimeter-wave radar 11 to transmit the calculated controlled variable to a vehicle controller 30.

The in-vehicle camera 10 is a monocular camera configured by a CCD image sensor, a CMOS image sensor, a near-infrared sensor, or the like, or a stereo camera. The in-vehicle camera 10 captures images of the peripheral environment of the own vehicle MA to successively transmit image information of the captured images to the ECU 20. As shown in FIG. 1, the in-vehicle camera 10 is disposed, for example, in the vicinity of the top edge of the windshield of the own vehicle MA, and captures images of an area extending ahead of the own vehicle MA within a range having a first predetermined angle centering on an imaging axis.

The millimeter-wave radar 11 is a sensor that transmits a transmission wave, which is an electromagnetic wave, and receives a reflected wave, which is the transmission wave reflected from an object, to detect the object. As shown in FIG. 1, the millimeter-wave radar 11 is disposed at a front end of the own vehicle MA and transmits a transmission wave so as to scan an area extending ahead of the own vehicle MA within a range having a second predetermined angle centering on a reference axis. The millimeter-wave radar 11 generates ranging data based on a time period between the transmission and the reception to successively transmit the generated ranging data to the ECU 20. The ranging data includes a direction in which the object is present, a distance to the object, and a relative speed of the object with respect to the own vehicle MA.

The vehicle controller 30 corresponds to a steering controller, a brake controller, and an engine controller. The steering controller performs steering control of the own vehicle MA based on a target steering angle received from the ECU 20. The brake controller performs brake control of the own vehicle MA based on target brake force received from the ECU 20. The engine controller performs engine control of the own vehicle MA based on a target output of the engine received from the ECU 20.

The ECU 20 receives image information acquired by the in-vehicle camera 10 and ranging data acquired by the millimeter-wave radar 11 and receives an on-off signal from a switch 12. The switch 12 operates when the driver selects a traveling control mode. When the switch 12 is turned on or off by the driver, the switch 12 transmits an on signal or an off signal to the ECU 20. In the ECU 20, as described above, the CPU executes a program stored in the ROM to realize functions of a path generation section 21, a cut-in determination section 22, a follow-up target selection section 23, a lateral position control section 24, an inter-vehicular distance controlled object selection section 25, and an inter-vehicular distance control section 26.

The path generation section 21 (generation means) generates a traveling path of a vehicle (hereinafter, referred to as "target vehicle", "second vehicle", "different vehicle", or "another vehicle"), which is different from the own vehicle MA, present ahead of the own vehicle MA, from a history of positions of the target vehicle. Specifically, the path generation section 21 calculates positions of the target vehicle at predetermined periods based on image information received from the in-vehicle camera 10 and ranging data (direction and distance) received from the millimeter-wave radar 11 to store the calculated positions of the target vehicle in time series. The position of the target vehicle consists of a longitudinal position in the traveling direction and a lateral position in the width direction of the own vehicle MA.

When calculating the position of the target vehicle from the image information, the path generation section 21 extracts an edge from the image information to detect the target vehicle, and then calculates the position of the target vehicle. When the position of the target vehicle is calculated from the ranging data, although the accuracy of the distance in the traveling direction is relatively high, the accuracy of the distance to the lateral position is relatively low. In a case where the in-vehicle camera 10 is a monocular camera, when the position of the target vehicle is calculated from the image information, although the accuracy of the distance to the lateral position is relatively high, the accuracy of the distance in the traveling direction is relatively low. Hence, combining the image information with the ranging data can increase the accuracy of calculating the position of the target vehicle. The path generation section 21 connects the positions of the target vehicle stored in time series to generate a traveling path of the target vehicle.

The path generation section 21 generates a traveling path of a target vehicle running in a driving lane of the own vehicle MA and a traveling path of a target vehicle running in a lane next to the driving lane of the own vehicle MA. In the present embodiment, since the ECU 20 does not recognize a white line, whether or not a target vehicle runs in the next lane is determined from the distance from the own vehicle MA in the width direction.

Specifically, a value that is half the assumed width of the driving lane of the own vehicle MA is defined as a threshold value w1 (first threshold value). A value that is larger than the threshold value w1, specifically, about three times the threshold value w1, is defined as a threshold value w2 (second threshold value). The path generation section 21 defines a vehicle, whose lateral distance from the lateral position of the own vehicle MA is smaller than the threshold value w2, as a target vehicle running in a driving lane of the own vehicle MA or a lane next to the driving lane, to generate a traveling path of the target vehicle. The lateral position is a position in the width direction of the own vehicle MA (position on a coordinate in the lateral direction). The lateral distance is a distance between the lateral position of the own vehicle MA and the lateral position of the target vehicle. In the present embodiment, the origin of the lateral point is defined as the barycenter of the own vehicle MA. However, any base point can be defined as the origin of the lateral point if the distance between the own vehicle MA and the target vehicle in the width direction can be determined. For example, the point positioned ahead of the barycenter of the own vehicle MA at a predetermined distance may be defined as the origin of the lateral point. In addition, the assumed width of the driving lane may be a lane width of a typical road. When lane width information can be acquired from map information or through road-to-vehicle communication, the assumed width may be the acquired lane width information. Note that the number of target vehicles for which the path generation section 21 generates a traveling path depends on the capacity of the ECU 20.

After the own vehicle MA enters a predetermined lane, the ECU 20 performs traveling control for a target vehicle, which is one of the vehicles traveling ahead of the own vehicle MA and in the same lane as that of the own vehicle MA and is present at a position closest to the own vehicle MA. The traveling control performed by the ECU 20 includes lateral position follow-up control (following control) and inter-vehicular distance control. Under the lateral position follow-up control, the lateral position of the own vehicle MA is made to follow the lateral position of a target vehicle to be controlled. Under the inter-vehicular distance control, the distance between the own vehicle MA and a target vehicle subject to the traveling control is kept within a predetermined distance. The ECU 20 generally performs the lateral position follow-up control and the inter-vehicular distance control for the same target vehicle as a target subject to the traveling control. Generally, a driver drives a vehicle so as to run substantially at the middle of the lane. Hence, when the ECU 20 is performing the lateral position follow-up control, the own vehicle MA follows the target vehicle subject to the traveling control, thereby running substantially at the middle of the driving lane.

Figure 3:
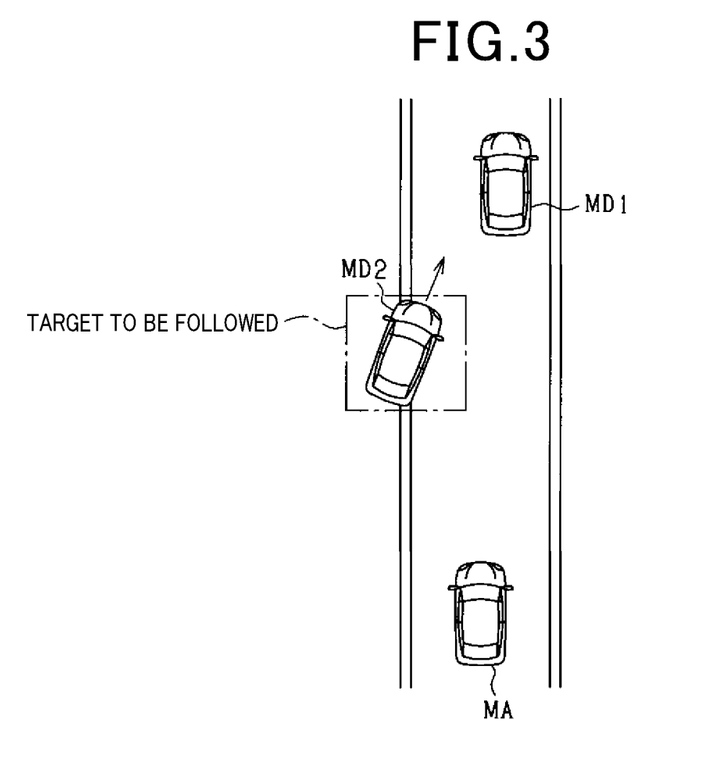
FIG. 3 is a diagram illustrating a target to be followed when cutting in (interruption) occurs according to a conventional example.

As shown in FIG. 3, when another target vehicle MD2 cuts in (enters) a space between a target MD1 subject to the traveling control and the own vehicle MA, the target vehicle MD2 is the vehicle closest to the own vehicle MA in the driving lane of the own vehicle MA. Hence, conventionally, the target vehicle MD2 is selected as a new target subject to the traveling control. As a target subject to the inter-vehicular distance control, the target vehicle MD2 is required to be selected for safety reasons. However, if the target vehicle MD2 is selected as a target, whose lateral position is followed, at the beginning of the cutting in (interrupt), that is, until the target vehicle MD2 enters the substantial middle of the driving lane, the own vehicle MA is likely to wobble because the own vehicle MA follows the target vehicle MD2. To solve this problem, in the present embodiment, when cutting in begins, the ECU 20 separately selects a target whose lateral position is followed and a target subject to the inter-vehicular distance control by functions described later, to perform the traveling control.

Figures 4A, 4B:
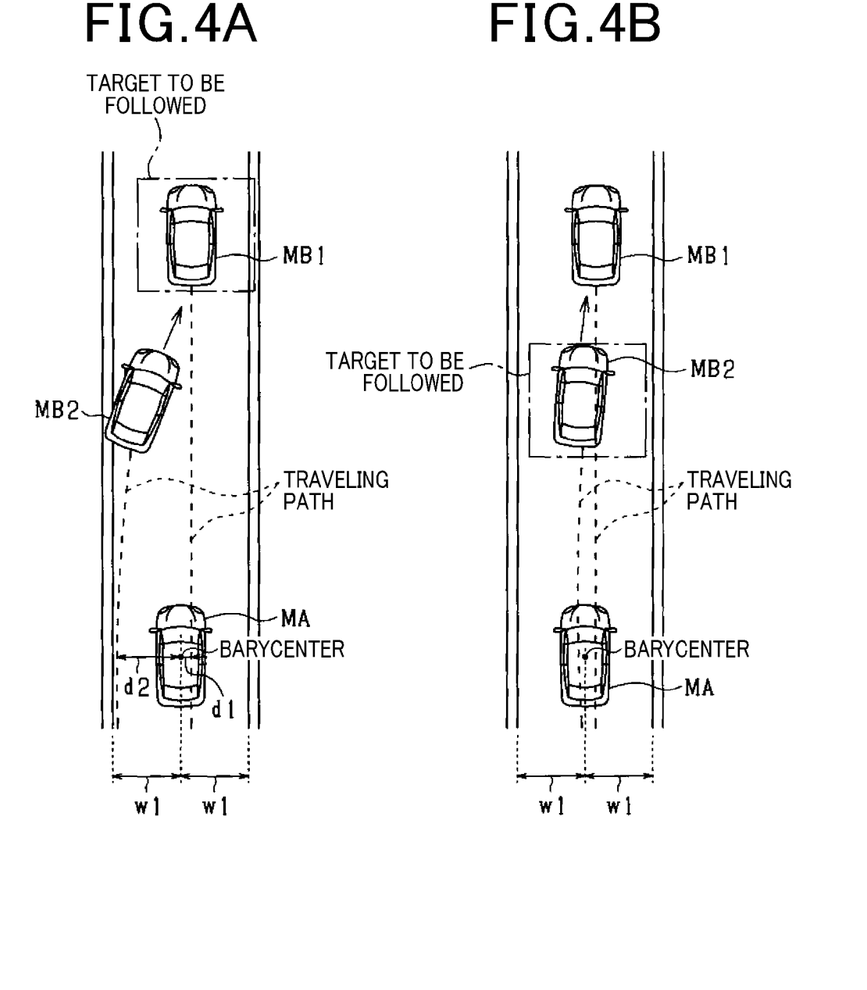
FIG. 4A is a diagram illustrating a target to be followed when cutting in is started according to the first embodiment.
FIG. 4B is a diagram illustrating a target to be followed when cutting in is completed according to the first embodiment.

When the lateral position of the own vehicle MA is made to follow the lateral position of the forward target MB1 to be followed, the cut-in determination section 22 (determination means) determines whether or not, in the driving lane of the own vehicle MA, a target vehicle different from the target MB1 cuts in the space between the own vehicle MA and the target MB1 to be followed. Specifically, in a space between the own vehicle MA and the target MB1 to be followed in the traveling direction of the own vehicle MA, if the lateral distance between the lateral position of the own vehicle MA and any lateral position on the traveling path of a target vehicle different from the target MB1 becomes smaller than the threshold value w1, the cut-in determination section 22 determines that cutting in occurs. That is, as shown in FIG. 4A, when cutting in of a target vehicle MB2 occurs, the cut-in determination section 22 determines that cutting in of the target vehicle MB2 occurs at the time when a lateral distance d2 between the lateral position of the own vehicle MA and the lateral position on the traveling path of the target vehicle MB2 becomes smaller than the threshold value w1. Since the traveling path of the target vehicle, which runs in the next lane, has been generated by the path generation section 21, it can be determined that the target vehicle MB2 cuts in the driving lane of the own vehicle MA from the outside of the driving lane by not recognizing a white line but by using the traveling path. Hereinafter, the target vehicle MB2 is referred to as a "cut-in vehicle (cutting-in vehicle)".

If the cut-in determination section 22 determines that cutting in occurs, the follow-up target selection section 23 (comparison means, first selection means) compares the lateral distance between the lateral position of the own vehicle MA and the lateral position on the traveling path of the current target MB1 to be followed with the lateral distance between the lateral position of the own vehicle MA and the lateral position on the traveling path of the cut-in vehicle MB2. The follow-up target selection section 23 selects one of the current target MB1 to be followed and the cut-in vehicle MB2, the lateral distance of which is determined to be smaller, as a new target to be followed. As shown in FIG. 4A, at the beginning of the cutting in, the lateral distance d1 between the lateral position of the current target MB1 to be followed and the lateral position of the own vehicle MA is smaller than the lateral distance d2 between the lateral position of the cut-in vehicle MB2 and the lateral position of the own vehicle MA. Hence, the follow-up target selection section 23 continuously selects the current target MB1 to be followed as a target whose lateral position is followed.

Thereafter, as shown in FIG. 4B, when the cut-in vehicle MB2 enters the substantially middle of the lane, the lateral distance d2 becomes smaller than the lateral distance d1. Hence, the follow-up target selection section 23 selects the cut-in vehicle MB2 as a new target to be followed. However, when cutting in of the cut-in vehicle MB2 is completed, previous positions of the target MB1 to be followed cannot be acquired, whereby the traveling path of the target MB1 may not be generated. In this case, at the time when calculating the lateral distance d1 is stopped, the follow-up target selection section 23 determines that the lateral distance to the cut-in vehicle MB2 is smaller and selects the cut-in vehicle MB2 as a new target to be followed. In addition, if the cut-in determination section 22 does not determine that cutting in occurs, the follow-up target selection section 23 selects another vehicle closest to the own vehicle MA in the driving lane of the own vehicle MA as a target whose lateral position is followed.

Note that the cut-in determination section 22 determines that cutting in occurs from the time when the lateral distance d2 between the lateral position on the traveling path of the cut-in vehicle MB2 and the lateral position of the own vehicle MA becomes smaller than the threshold value w1 and until the cut-in vehicle MB2 is selected as a new target to be followed.

The lateral position control section 24 (first control means) makes the lateral position of the own vehicle MA follow the lateral position of the target to be followed selected by the follow-up target selection section 23. Specifically, the lateral position control section 24 calculates a target steering angle for making the lateral position of the own vehicle MA follow the lateral position of the target to be followed to transmit the calculated target steering angle to the vehicle controller 30.

The inter-vehicular distance controlled object selection section 25 (second selection means) selects another vehicle whose distance from the own vehicle MA is shortest among vehicles present in the driving lane of the own vehicle MA as an object subject to the inter-vehicular distance control. At the beginning of the cutting in shown in FIG. 4A, the inter-vehicular distance controlled object selection section 25 selects the cut-in vehicle MB2 as an object subject to the inter-vehicular distance control. Hence, at the beginning of the cutting in shown in FIG. 4A, the current target MB1 to be followed is continuously selected as a target whose lateral position is followed, and the cut-in vehicle MB2 is selected as an object subject to the inter-vehicular distance control instead of the previous target MB1. In addition, as shown in FIG. 4B, when the cutting in is completed, the cut-in vehicle MB2 is selected as both the target whose lateral position is followed and the object subject to the inter-vehicular distance control.

The inter-vehicular distance control section 26 (second control means) keeps the distance between the own vehicle MA and the preceding vehicle, which is one of the vehicles running ahead of the own vehicle MA on the driving lane of the own vehicle MA, in a predetermined distance. Specifically, the inter-vehicular distance control section 26 calculates target brake force for keeping the distance to the object subject to the inter-vehicular distance control in the predetermined distance and target output of the engine to transmit the calculated target brake force and the target output of the engine to the vehicle controller 30.

Next, a procedure for performing follow-up control of the lateral position according to the present embodiment is described with reference to the flowchart shown in FIG. 5. The procedure is performed by the ECU 20 at predetermined time intervals.

First, the ECU 20 determines whether or not the traveling control is being performed (S10). That is, the ECU 20 determines whether or not the switch 12 has been turned on by the driver. If the traveling control is not being performed (S10: NO), the present process is ended. In contrast, if the traveling control is being performed (S10: YES), the ECU 20 determines whether or not there is another vehicle that should be regarded as a target to be followed running ahead of the own vehicle MA and in the driving lane of the own vehicle MA or another vehicle that is not a target to be followed and should be regarded as an object subject to the inter-vehicular distance control (S11). If the ECU 20 determines that there is no another vehicle that should be regarded as a target to be followed and another vehicle that should be regarded as an object subject to the inter-vehicular distance control (S11: NO), the process proceeds to S14.

If the ECU 20 determines that there is another vehicle that should be regarded as a target to be followed or another vehicle that should be regarded as an object subject to the inter-vehicular distance control (S11: YES), the ECU 20 generates a traveling path of the target to be followed or the object subject to the inter-vehicular distance control based on a history of positions of the target to be followed or the object subject to the inter-vehicular distance control, and stores the generated traveling path (S12). Next, the ECU 20 performs the follow-up control under which the lateral position of the own vehicle MA is made to follow the lateral position of the target to be followed by using the traveling path of the target to be followed stored in S12. If there is no object subject to the inter-vehicular distance control different from the target to be followed, the ECU 20 performs the inter-vehicular distance control for the target to be followed by using the traveling path of the target to be followed. If there is an object subject to the inter-vehicular distance control different from the target to be followed, the ECU 20 performs the inter-vehicular distance control for the object subject to the inter-vehicular distance control by using the traveling path of the object subject to the inter-vehicular distance control (S13).

Next, the ECU 20 determines whether or not there is another vehicle in a lane next to the driving lane of the own vehicle MA (S14). That is, the ECU 20 determines whether or not the vehicles running ahead of the vehicle MA include a vehicle whose lateral distance from the lateral position of the own vehicle MA is equal to or more than the threshold value w1 and less than the threshold value w2. If the ECU 20 determines that there is no vehicle in the next lane (S14: NO), the present process is ended.

If the ECU 20 determines that there is another vehicle in the next lane (S14: YES), the ECU 20 generates a traveling path of the vehicle in the next lane based on the history of positions of the vehicle in the next lane and stores the generated traveling path (S15). Next, ECU 20 determines whether or not there is a target to be followed and cutting in occurs between the own vehicle MA and the target to be followed (S16). If the ECU 20 determines that there is no target to be followed or cutting in does not occur (S16: NO), the present process is ended.

If the ECU 20 determines that there is a target to be followed and cutting in occurs (S16: YES), the ECU 20 selects a target whose lateral position is followed based on the result of the comparison between the lateral positions on traveling paths of the current target to be followed and the cut-in vehicle. Specifically, the ECU 20 compares the lateral distance between the own vehicle MA and the lateral position on the traveling path of the current target to be followed with the lateral distance between the own vehicle MA and the lateral position on the traveling path of the cut-in vehicle. The ECU 20 selects the vehicle, the lateral distance of which is determined to be smaller, as a new target whose lateral position is followed. In addition, the ECU 20 selects another vehicle closest to the own vehicle MA in the driving lane of the own vehicle MA, that is, a cut-in vehicle, as an object subject to the inter-vehicular distance control (S17).

Hence, as shown in FIG. 4A, in a state where the follow-up control of the lateral distance and the inter-vehicular distance control are performed for the target to be followed, when the ECU 20 determines that cutting in occurs, the ECU 20 starts the inter-vehicular distance control for the cut-in vehicle MB2 while continuing the follow-up control of the lateral position for the target MB1 to be followed at the time. Thereafter, as shown in FIG. 4B, when the cutting in is completed, the ECU 20 selects the cut-in vehicle MB2 as a target to be followed and starts the follow-up control of the lateral position and the inter-vehicular distance control for the cut-in vehicle. Then, the present process ends.

According to the first embodiment described above, the following advantages are provided.

In a state where the follow-up control of the lateral position is being performed, when cutting in occurs, not the cut-in vehicle MB2 but the current target MB1 to be followed is continuously selected as a target to be followed until the lateral distance d2 between the cut-in vehicle MB2 and the own vehicle MA becomes smaller than the lateral distance d1 between the current forward target MB1 and the own vehicle MA. Hence, at the beginning of the cutting in, the own vehicle MA is prevented from wobbling caused by following the cut-in vehicle MB2. Hence, even when cutting in occurs, an inappropriate vehicle is prevented from being selected as an object subject to the follow-up control of the lateral position, whereby an appropriate vehicle can be selected.

Generally, when the follow-up control of the lateral position is being performed, the own vehicle MA often runs substantially at the middle of the driving lane. Hence, when the lateral distance between the lateral position of the own vehicle MA and any lateral position on the traveling path of a vehicle different from the target to be followed becomes smaller than the threshold value w1, it can be determined that the own vehicle MA cuts in the driving lane of the own vehicle MA.

If there is a vehicle, the lateral distance from the own vehicle MA of which is less than the threshold value w2, a traveling path of the vehicle is generated even when the vehicle is present outside the driving lane of the own vehicle MA. Hence, by using the traveling path of the vehicle, it can be determined that the vehicle cuts in the driving lane of the own vehicle MA from the outside of the driving lane of the own vehicle MA.

In the driving lane of the own vehicle MA, the vehicle, the distance from the own vehicle MA of which is shortest, is selected as an object subject to the inter-vehicular distance control, and the inter-vehicular distance control is performed. Hence, when cutting in occurs, the cut-in vehicle MB2 is selected as an object subject to the inter-vehicular distance control, before the cut-in vehicle MB2 is selected as a target whose lateral position is followed. Hence, even when cutting in occurs, a target whose lateral position is followed and an object subject to the inter-vehicular distance control are appropriately selected.

In a state where the follow-up control of the lateral position and the inter-vehicular distance control are being performed, if it is determines that cutting in occurs, the inter-vehicular distance control for the cut-in vehicle is immediately performed. However, the follow-up control of the lateral position for the cut-in vehicle is not immediately performed. Hence, while a collision between the own vehicle MA and the cut-in vehicle is avoided, the own vehicle MA can be prevented from wobbling.

Second Embodiment

Figure 6:
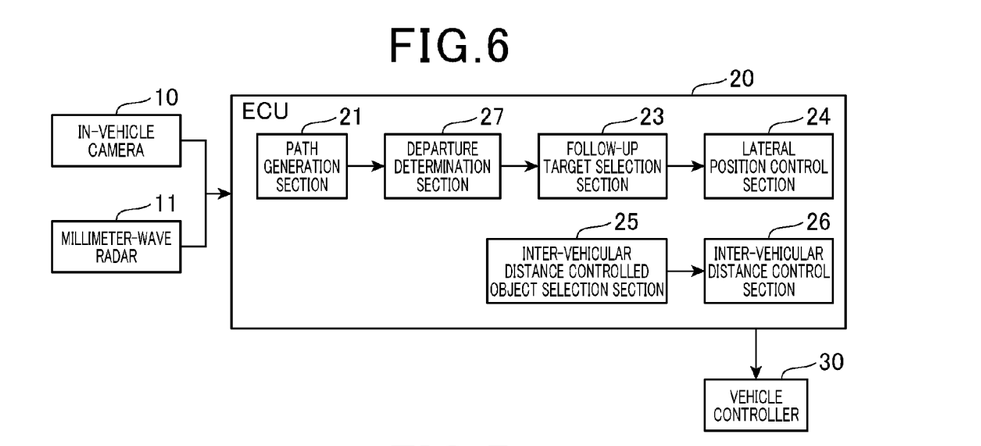
FIG. 6 is a block diagram showing a schematic configuration of a traveling control apparatus for a vehicle according to a second embodiment.

The schematic configuration of the traveling control apparatus for a vehicle according to the second embodiment is described with reference to FIG. 6 focusing on the differences from the traveling control apparatus according to the first embodiment.

In a case where the lateral position of the own vehicle MA is made to follow the lateral position of the target to be followed, when the target to be followed departs from the driving lane of the own vehicle MA, the own vehicle MA is likely to wobble by following the departing target to be followed if the own vehicle MA continuously follows the target to be followed. Hence, when the target to be followed departs from the driving lane, it is desirable to promptly determine the departure to terminate selection of the current target to be followed. As a target subject to the inter-vehicular distance control, the departing target to be followed is required to be continuously selected until the departing target to be followed exits from the driving lane of the own vehicle MA for safety reasons.

In the present embodiment, the ECU 20 realizes functions of a departure determination section 27, instead of the cut-in determination section 22, to separately select a target whose lateral position is followed and an object subject to the inter-vehicular distance control when the target to be followed departs from the driving lane, thereby performing traveling control.

Figure 7:
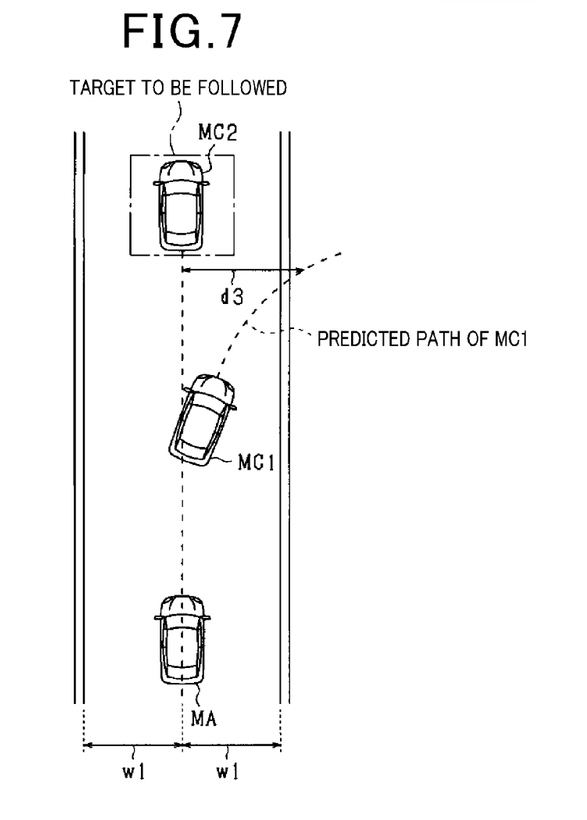
FIG. 7 is a diagram illustrating a target to be followed when departure occurs according to the second embodiment.

As shown in FIG. 7, in a state where the lateral position of the own vehicle MA is made to follow the lateral position of the forward target MC1 to be followed, when the lateral distance d3 between the lateral position of the predicted path of the target MC1 to be followed and the lateral position of the own vehicle MA is larger than the threshold value w1, the departure determination section 27 determines that the target MC1 to be followed departs from the driving lane. The predicted path of the target MC1 to be followed is a prospective traveling path of the target MC1 to be followed predicted from the traveling path of the target MC1 to be followed. If the driver of the target MC1 to be followed turns the steering wheel for departure, the position of the target MC1 to be followed shifts to the outside of the driving lane, and the predicted path departs for the outside of the driving lane. The lateral distance d3 is a distance between the lateral position of the own vehicle MA and any portion on the predicted path. When the target MC1 to be followed continuously runs in a straight line, the predicted path becomes a straight line, and the lateral distance between the lateral position of the own vehicle MA and any portion on the predicted path becomes less than the threshold value w1.

In addition, when the departure determination section 27 determines that the current target MC1 to be followed departs from the driving lane, the follow-up target selection section 23 terminates selection of the current target MC1 to be followed as an target to be followed. The follow-up target selection section 23 selects a vehicle, which is one of the vehicles running in the driving lane of the own 3o vehicle MA and is different from the previous target MC1 to be followed, and which corresponds a traveling path, the lateral distance from the lateral position of the own vehicle MA of which is shortest, as a new target whose lateral position is followed. In FIG. 7, another vehicle MC2 running ahead of the previous target MC1 to be followed is selected as a new target to be followed. Note that if such a vehicle is not present, the follow-up target selection section 23 terminates the follow-up control of the lateral position.

Accordingly, between the time when the departure of the previous target MC1 is determined and the time when the previous target MC1 to be followed exits from the driving lane of the own vehicle MA, the vehicle MC2 is selected as a target whose lateral position is followed, and the previous target MC1 to be followed is continuously selected as an object subject to the inter-vehicular distance control. Thereafter, the vehicle MC2 is selected as a target whose lateral position is followed and also as an object subject to the inter-vehicular distance control.

Figure 8:
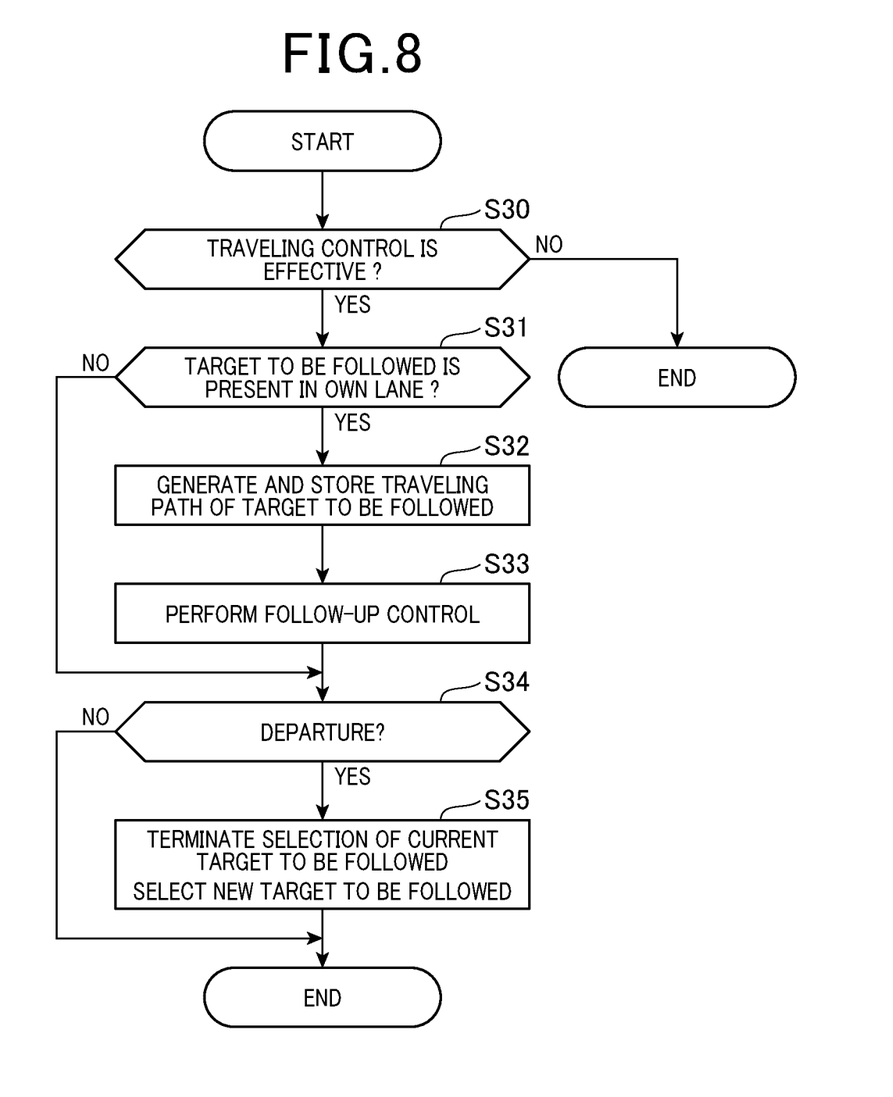
FIG. 8 is a flowchart showing a procedure for performing follow-up control of the lateral position according to the second embodiment.

Next, a procedure for performing follow-up control of the lateral position according to the present embodiment is described with reference to the flowchart shown in FIG. 8. The procedure is performed by the ECU 20 at predetermined time intervals.

Figure 5:
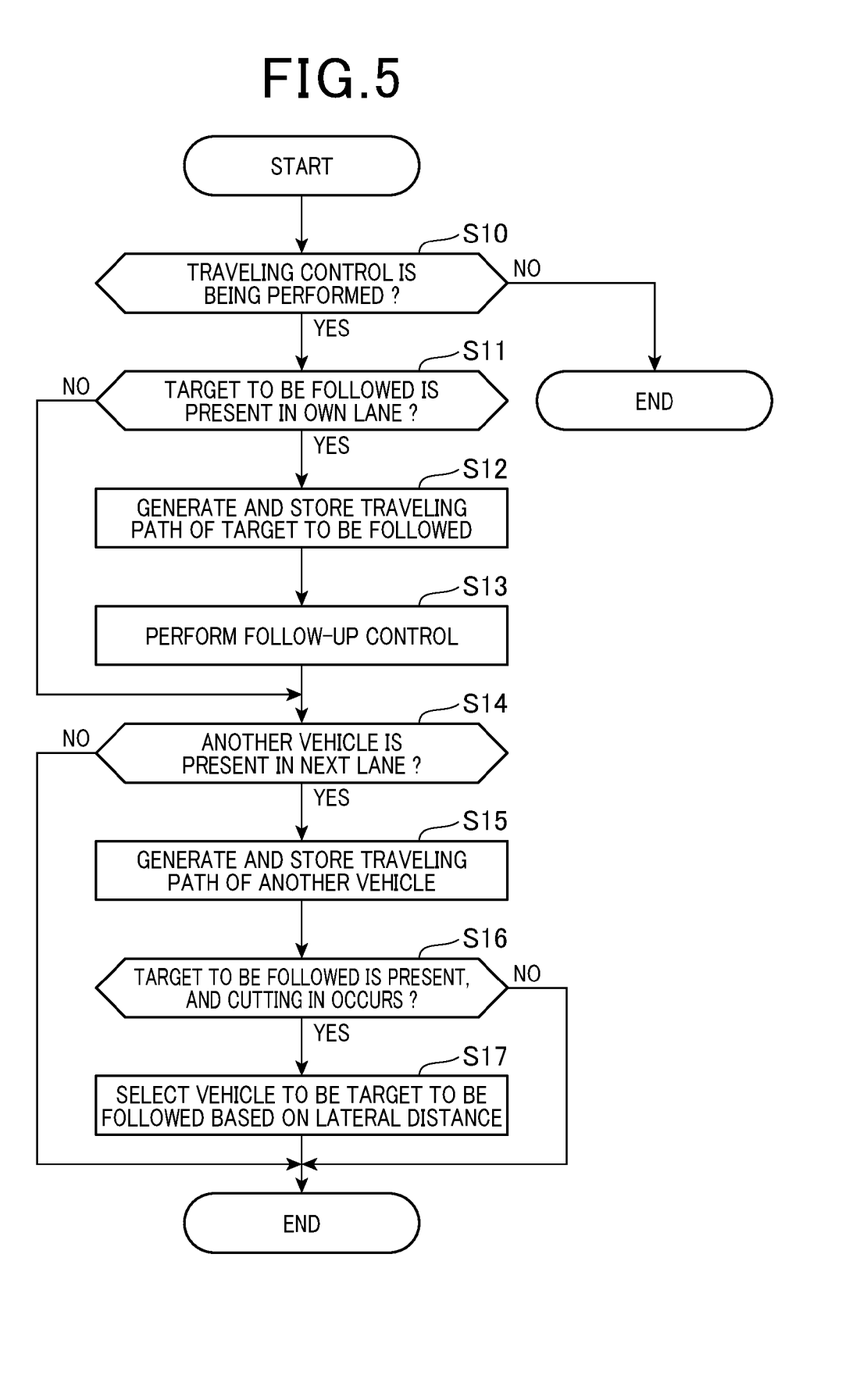
FIG. 5 is a flowchart showing a procedure for performing follow-up control of the lateral position according to the first embodiment.

First, in steps S30 to S33, processes similar to steps S10 to S13 in the flowchart of FIG. 5 are performed. Next, the ECU 20 determines whether or not the current target whose lateral position is followed departs from the driving lane (S34). If the ECU 20 determines that the current target does not depart from the driving lane (S34: NO), the present process is ended.

If the ECU 20 determines that the current target whose lateral position is followed departs from the driving lane (S34: YES), the ECU 20 terminates selection of the current target to be followed as a target whose lateral position is followed. Then, the ECU 20 selects a new target whose lateral position is followed. In addition, the ECU 20 selects a vehicle closest to the own vehicle MA in the driving lane of the own vehicle MA, that is, a cut-in vehicle, as an object subject to the inter-vehicular distance control (S35). As shown in FIG. 7, when the current target MC1 to be followed starts departing, the vehicle MC2 is selected as a new target to be followed, and the current target MC1 to be followed is continuously selected as an object subject to the inter-vehicular distance control. Hence, in a state where the follow-up control of the lateral position and the inter-vehicular distance control are performed for the target MC1 to be followed, if the ECU 20 determines that the departure of the target to be followed occurs, the ECU 20 starts the follow-up control of the lateral position for the newly selected target MC2 to be followed, while the inter-vehicular distance control for the target MC1 to be followed at the time is continued. Thereafter, when the previous target MC1 to be followed exits from the driving lane of the own vehicle MA, the ECU 20 starts the follow-up control of the lateral position and the inter-vehicular distance control for the new target MC2 to be followed.

According to the second embodiment described above, the following advantages are provided.

In a state where the follow-up control of the lateral position is being performed, when the lateral distance d3 between the lateral position of the predicted path of the target MC1 to be followed and the lateral position of the own vehicle MA is larger than the threshold value w1, it can be determined that the target MC1 to be followed departs from the driving lane of the own vehicle MA before the target MC1 to be followed actually departs from the driving lane of the own vehicle MA. If it is determined that the target MC1 to be followed departs from the driving lane of the own vehicle MA, the current target MC1 to be followed is not selected as an object subject to the follow-up control of the lateral position. Hence, the own vehicle MA is prevented from wobbling by following the departing target MC1 to be followed. Hence, when the target MC1 to be followed departs from the driving lane, an inappropriate vehicle can be prevented from being selected.

In a state where the follow-up control of the lateral position and the inter-vehicular distance control are being performed for the target MC1 to be followed, if it is determined that departure occurs, the follow-up control of the lateral position for the target MC1 to be followed at the time is immediately terminated. However, the inter-vehicular distance control for the target MC1 to be followed at the time is not immediately terminated. Hence, while a collision between the own vehicle MA and the target MC1 to be followed is avoided, the own vehicle MA can be prevented from wobbling.

Other Embodiments

The first embodiment and the second embodiment may be combined with each other. That is, the EC22U 20 may realize functions of the cut-in determination section 22 and the departure determination section 27 not to select an inappropriate target whose lateral position is followed when cutting in occurs or when departure occurs.

The process of step S17 in the flowchart of FIG. 5 may be modified as below. If the lateral distance between the lateral position on the traveling path of the current target to be followed and the lateral position on the traveling path of the cut-in vehicle is larger than a predetermined value, the ECU 20 may continuously select the current target to be followed as a target whose lateral position is followed. If the lateral distance is not larger than the predetermined value, the cut-in vehicle may be selected as a target whose lateral position is followed. Accordingly, since the cut-in vehicle is selected as a target whose lateral position is followed, after the cut-in vehicle approaches the own vehicle MA in the width direction of the own vehicle MA, the own vehicle MA can be prevented from wobbling.

The process of step S17 in the flowchart of FIG. 5 may be modified as below. Within a predetermined time period from the time when the determination is changed from that cutting does not occur to that cutting occurs, the ECU 20 may continuously select the current target to be followed as a target whose lateral position is followed. When the predetermined time period has passed, the cut-in vehicle may be selected as a target whose lateral position is followed. Until the predetermined time period passes, the lateral distance between the lateral position on the traveling path of the current target to be followed and the lateral position on the traveling path of the cut-in vehicle is larger than the predetermined value. Hence, since the cut-in vehicle is selected as a target whose lateral position is followed, after the cut-in vehicle approaches the own vehicle MA in the width direction of the own vehicle MA, the own vehicle MA can be prevented from wobbling. Note that the predetermined time period may be changed depending on the speed of the cut-in vehicle or the own vehicle MA.

The ECU 20 may not perform the inter-vehicular distance control, but perform only the follow-up control of the lateral position.

Instead of the millimeter-wave radar 11, a laser radar or an ultrasonic sensor may be used. Specifically, since an ultrasonic sensor is more inexpensive than the millimeter-wave radar 11, providing a plurality of ultrasonic sensors on the outer periphery of the own vehicle MA can acquire ranging data of a target with triangulation.

One of the in-vehicle camera 10 and the millimeter-wave radar 11 may be used. In this case, using a stereo camera as the in-vehicle camera 10 can ensure the accuracy of the distance to a target in the traveling direction and the accuracy of the lateral position of the target.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a traveling control apparatus for a vehicle is provided. The apparatus includes: a generation section that generates traveling paths of vehicles from a history of positions of the vehicles present ahead of an own vehicle (MA); a first control section that defines one vehicle, which is included in the vehicles and runs in a driving lane of the own vehicle, as a target (MB1) to be followed, and that makes a lateral position of the own vehicle follow a lateral position which is a position of the target to be followed in a width direction of the own vehicle; a determination section that determines, when the first control section is performing follow-up control for the target to be followed, whether or not, in the driving lane of the own vehicle, one of the vehicles, which is different from the target to be followed, cuts in a space between the own vehicle and the target to be followed; and a first selection section that selects, when the determination section determines that cutting in occurs, the current target to be followed or the cut-in vehicle as the target to be followed, based on a result of comparison between the lateral positions on the traveling paths respectively generated for the current target to be followed and the cut-in vehicle (MB2).

According to the embodiment, traveling paths of vehicles are generated from a history of positions of the vehicles present ahead of an own vehicle. In addition, follow-up control is performed for making the lateral position of the own vehicle follow the lateral position of the target to be followed included in the vehicles. Then, when the follow-up control is being performed, it is determined whether or not, in the driving lane of the own vehicle, a vehicle, which is different from the target to be followed, cuts in a space between the own vehicle and the target to be followed. When it is determined that cutting in occurs, a target whose lateral position is followed is selected based on a result of comparison between the lateral positions on the traveling paths respectively generated for the current target to be followed and the cut-in vehicle.

Hence, even when cutting in occurs, the cut-in vehicle is not immediately selected as a target to be followed, but the target to be followed is selected based on the result of comparison between the lateral positions on the traveling paths respectively generated for the current target to be followed and the cut-in vehicle. Hence, the own vehicle is prevented from wobbling caused by following the cut-in vehicle. Hence, even when cutting in occurs, an inappropriate vehicle is prevented from being selected as an object subject to the follow-up control of the lateral position, whereby an appropriate vehicle can be selected.

As another aspect of the embodiment, a traveling control apparatus for a vehicle is provided. The apparatus includes: a generation section that generates traveling paths of vehicles from a history of positions of the vehicles present ahead of an own vehicle (MA); a first control section that defines one vehicle, which is included in the vehicles and runs in a driving lane of the own vehicle, as a target (MB1) to be followed, and that makes a lateral position of the own vehicle follow a lateral position which is a position of the target to be followed in a width direction of the own vehicle; a determination section that determines, when the first control section is performing follow-up control, if a lateral distance between the lateral position of the own vehicle and the lateral position of a predicted path of the target to be followed, which is a prospective traveling path of the target to be followed predicted from the traveling path of the target to be followed, is larger than a first threshold value corresponding to a value that is half an assumed width of the driving lane, that the target to be followed departs from the driving lane of the own vehicle; and a first selection section that selects the target to be followed, and terminates selection of the current target as the target to be followed when the determination section determines that departure occurs.

According to the embodiment, traveling paths of vehicles are generated from a history of positions of the vehicles present ahead of an own vehicle. In addition, follow-up control is performed for making the lateral position of the own vehicle follow the lateral position of the target to be followed included in the vehicles. If the driver of the target to be followed turns the steering wheel for departure, the predicted path of the target to be followed departs for the outside of the driving lane of the own vehicle. Generally, when the follow-up control is being performed, the own vehicle often runs substantially at the middle of the driving lane. Hence, when the follow-up control is being performed, if the lateral distance between the lateral position of the predicted path of the target to be followed and the lateral position of the own vehicle is larger than the first threshold value corresponding to a value that is half the width of the driving lane, it can be determined that the target to be followed departs from the driving lane of the own vehicle before the target to be followed actually departs from the driving lane of the own vehicle.

If it is determined that the target to be followed departs from the driving lane of the own vehicle, the current target to be followed is not selected as an object subject to the follow-up control. Hence, when the target to be followed departs from the driving lane of the own vehicle, the own vehicle is prevented from wobbling by following the departing target to be followed. Hence, when the target to be followed departs from the driving lane, an inappropriate vehicle can be prevented from being selected as an object subject to the follow-up control of the lateral position.

What is claimed is:

1. A traveling control apparatus for a vehicle, the apparatus comprising:
    a generation section that generates traveling paths of vehicles from a history of positions of the vehicles present ahead of an own vehicle;
    a first control section that defines one vehicle, which is included in the vehicles and runs in a driving lane of the own vehicle, as a target to be followed, and that makes a lateral position of the own vehicle follow a lateral position which is a position of the target to be followed in a width direction of the own vehicle;
    a determination section that determines, when the first control section is performing follow-up control for the target to be followed, whether or not, in the driving lane of the own vehicle, one of the vehicles, which is different from the target to be followed, cuts in a space between the own vehicle and the target to be followed; and
    a first selection section that selects, when the determination section determines that cutting in occurs, the current target to be followed or the cut-in vehicle as the target to be followed, based on a result of comparison between the lateral positions on the traveling paths respectively generated for the current target to be followed and the cut-in vehicle.

2. The traveling control apparatus according to claim 1 further comprising a comparison section that compares a lateral distance between the lateral position of the own vehicle and the lateral position on the traveling path generated for the current target to be followed with the lateral distance between the lateral position of the own vehicle and the lateral position on the traveling path generated for the cut-in vehicle, wherein
    the first selection section selects the current target to be followed or the cut-in vehicle, the lateral distance of which is determined to be smaller by the comparison section, as the target to be followed.

3. The traveling control apparatus according to claim 1, wherein
    if a distance between the lateral position on the traveling path generated for the current target to be followed and the lateral position on the traveling path generated for the cut-in vehicle is larger than a predetermined value, the first selection section continuously selects the current target to be followed, and if the distance is not larger than the predetermined value, the first selection section selects the cut-in vehicle as the target to be followed.

4. The traveling control apparatus according to claim 1, wherein
    in the space between the own vehicle and the target to be followed in the traveling direction of the own vehicle, if the lateral distance between the lateral position of the own vehicle and any lateral position on the traveling path of the vehicle different from the target to be followed is smaller than a first threshold value corresponding to a value that is half an assumed width of the driving lane, the determination section determines that cutting in occurs.

5. The traveling control apparatus according to claim 1, wherein
    when the first control section is performing the follow-up control, if a lateral distance between the lateral position of the own vehicle and the lateral position of a predicted path of the target to be followed, which is a prospective traveling path of the target to be followed predicted from the traveling path of the target to be followed is larger than a first threshold value corresponding to a value that is half an assumed width of the driving lane, the determination section determines that the target to be followed departs from the driving lane of the own vehicle, and when the determination section determines that departure occurs, the first selection section terminates selection of the current target as the target to be followed.

6. The traveling control apparatus according to claim 1, further comprising:
a second control section that keeps, in the driving lane of the own vehicle, a distance between the own vehicle and a preceding vehicle, which runs ahead of the own vehicle, at a predetermined distance; and
a second selection section that selects, in the driving lane of the own vehicle, the vehicle, a distance from the own vehicle of which is shortest, as an object subject to inter-vehicular distance control performed by the second control section.

7. The traveling control apparatus according to claim 6, wherein
in a state where the follow-up control of the lateral position by the first control section and the inter-vehicular distance control by the second control section are performed for the target to be followed, when it is determines that the cutting in occurs, the inter-vehicular distance control for the cut-in vehicle is started while the follow-up control of the lateral position for the target to be followed at the time is continued.

8. The traveling control apparatus according to claim 1, wherein
a value larger than a first threshold value is defined as a second threshold value, and
the generation section generates the traveling path for the vehicle, a lateral distance from the lateral position of the own vehicle of which is smaller than the second threshold value.

9. A traveling control apparatus for a vehicle, the apparatus comprising:
a generation section that generates traveling paths of vehicles from a history of positions of the vehicles present ahead of an own vehicle;
a first control section that defines one vehicle, which is included in the vehicles and runs in a driving lane of the own vehicle, as a target to be followed, and that makes a lateral position of the own vehicle follow a lateral position which is a position of the target to be followed in a width direction of the own vehicle;
a determination section that determines, when the first control section is performing follow-up control, if a lateral distance between the lateral position of the own vehicle and the lateral position of a predicted path of the target to be followed, which is a prospective traveling path of the target to be followed predicted from the traveling path of the target to be followed, is larger than a first threshold value corresponding to a value that is half an assumed width of the driving lane, that the target to be followed departs from the driving lane of the own vehicle; and
a first selection section that selects the target to be followed, and terminates selection of the current target as the target to be followed when the determination section determines that departure occurs.

10. The traveling control apparatus according to claim 9, wherein
a value larger than the first threshold value is defined as a second threshold value, and
the generation section generates the traveling path for the vehicle, a lateral distance from the lateral position of the own vehicle of which is smaller than the second threshold value.

11. The traveling control apparatus according to claim 9, further comprising:
a second control section that keeps, in the driving lane of the own vehicle, a distance between the own vehicle and a preceding vehicle, which runs ahead of the own vehicle, in a predetermined distance; and
a second selection section that selects, in the driving lane of the own vehicle, the vehicle, a distance from the own vehicle of which is shortest, as an object subject to inter-vehicular distance control performed by the second control section, wherein
in a state where follow-up control of the lateral position by the first control section and inter-vehicular distance control by the second control section are performed for the target to be followed, when it is determined that the departure occurs, the follow-up control of the lateral position for the target to be followed at the time is completed while the inter-vehicular distance control for the target to be followed at the time is continued.

12. A method for controlling travel of a vehicle, the method comprising:
generating traveling paths of vehicles from a history of positions of the vehicles present ahead of an own vehicle;
defining one vehicle, which is included in the vehicles and runs in a driving lane of the own vehicle, as a target to be followed, and that makes a lateral position of the own vehicle follow a lateral position which is a position of the target to be followed in a width direction of the own vehicle;
determining, when performing follow-up control for the target to be followed, whether or not, in the driving lane of the own vehicle, one of the vehicles, which is different from the target to be followed, cuts in a space between the own vehicle and the target to be followed; and
selecting, when determining that cutting in occurs, the current target to be followed or the cut-in vehicle as the target to be followed, based on a result of comparison between the lateral positions on the traveling paths respectively generated for the current target to be followed and the cut-in vehicle.

\* \* \* \* \*